June 20, 1950 H. B. QUARFOOT 2,512,552
PRESSURE VESSEL ASSEMBLY
Filed Aug. 29, 1945 3 Sheets-Sheet 1
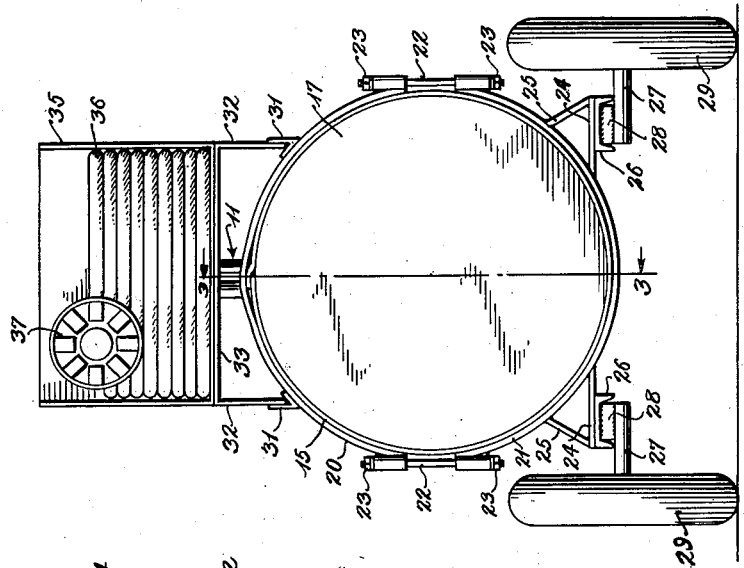
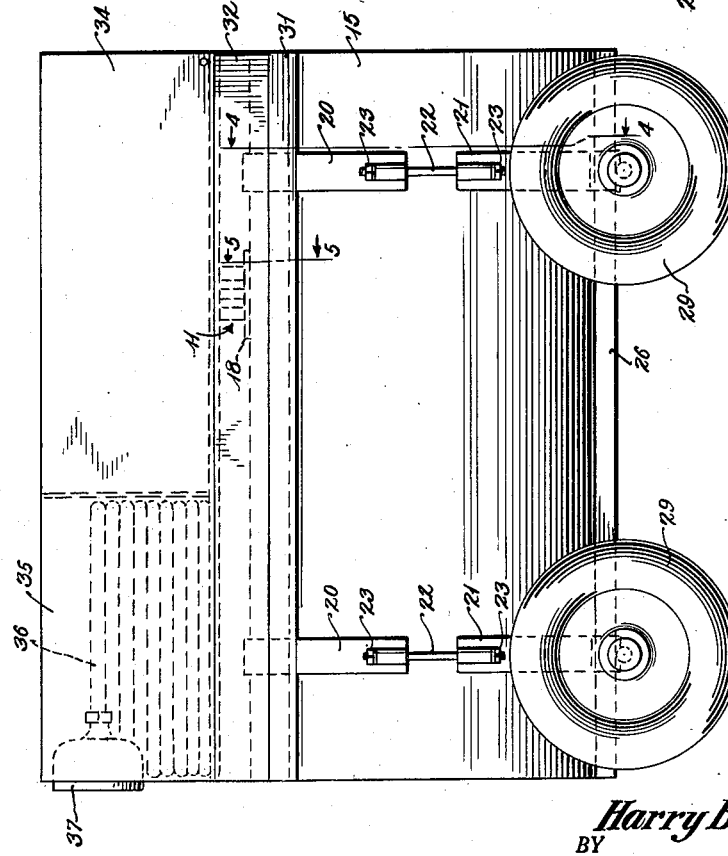
INVENTOR.
Harry B. Quarfoot
BY
L. Donald Myers
ATTORNEY June 20, 1950 H. B. QUARFOOT 2,512,552
PRESSURE VESSEL ASSEMBLY
Filed Aug. 29, 1945 3 Sheets-Sheet 2
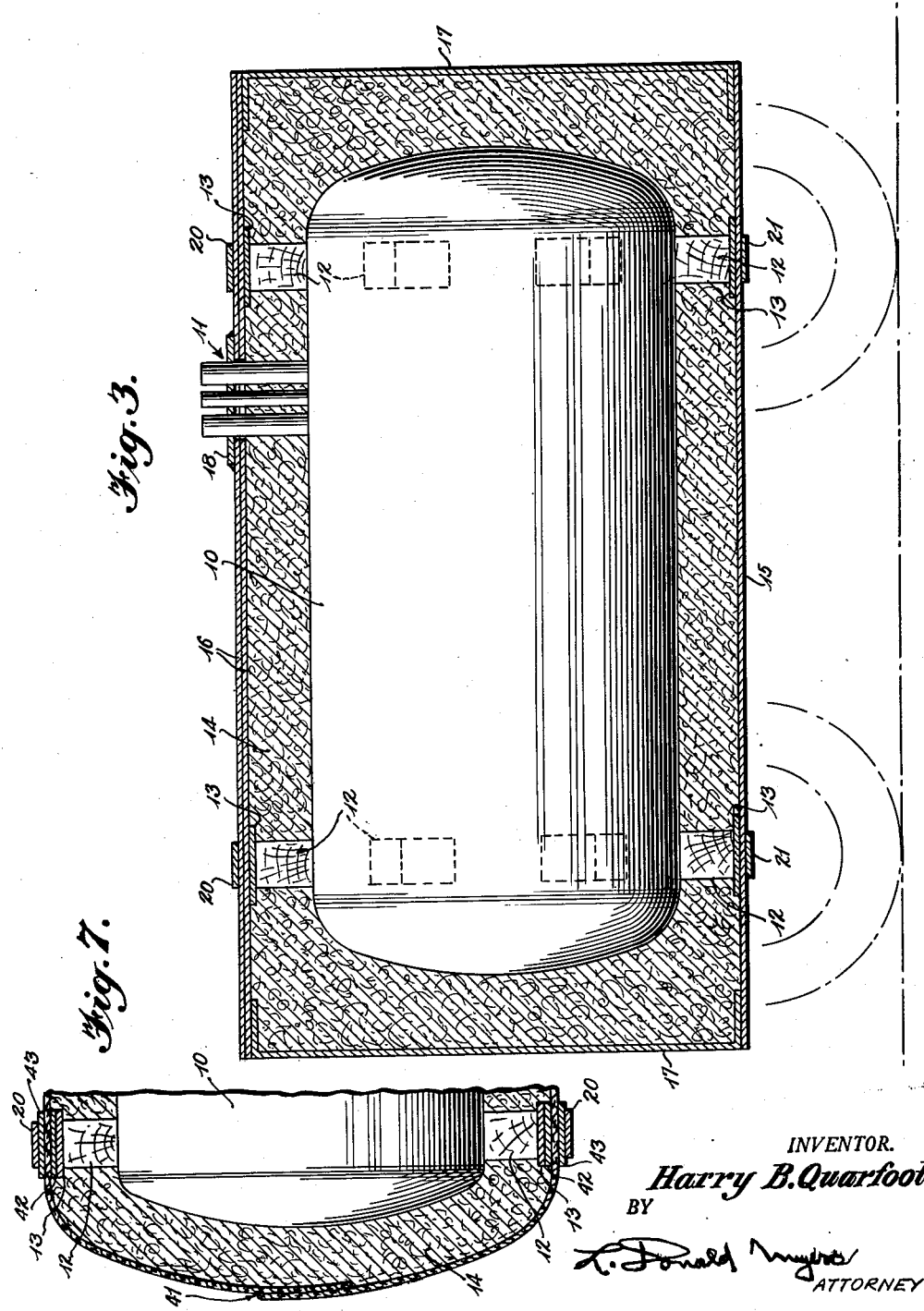
INVENTOR.
Harry B. Quarfoot
BY
L. Donald Myers
ATTORNEY June 20, 1950 H. B. QUARFOOT 2,512,552
PRESSURE VESSEL ASSEMBLY
Filed Aug. 29, 1945 3 Sheets-Sheet 3
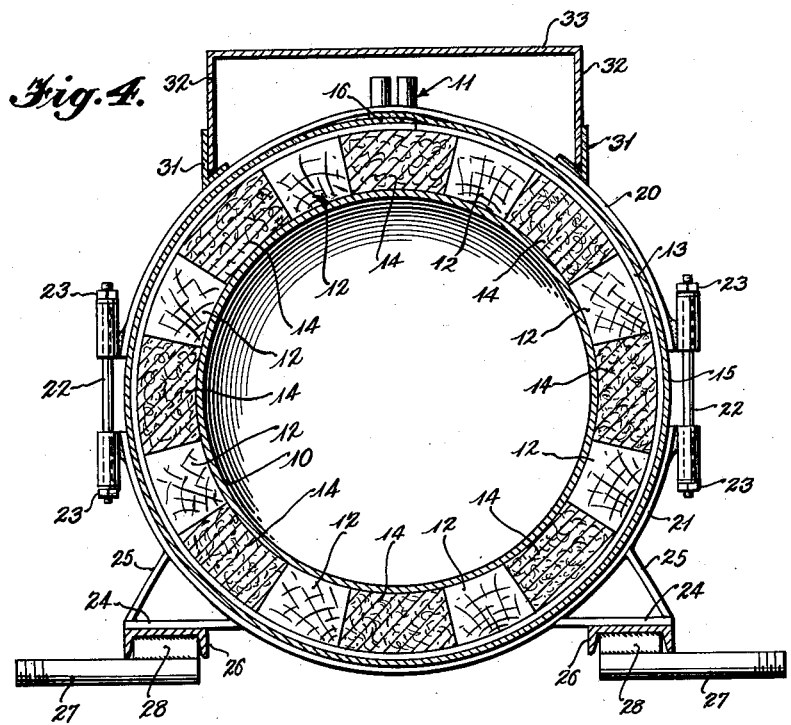
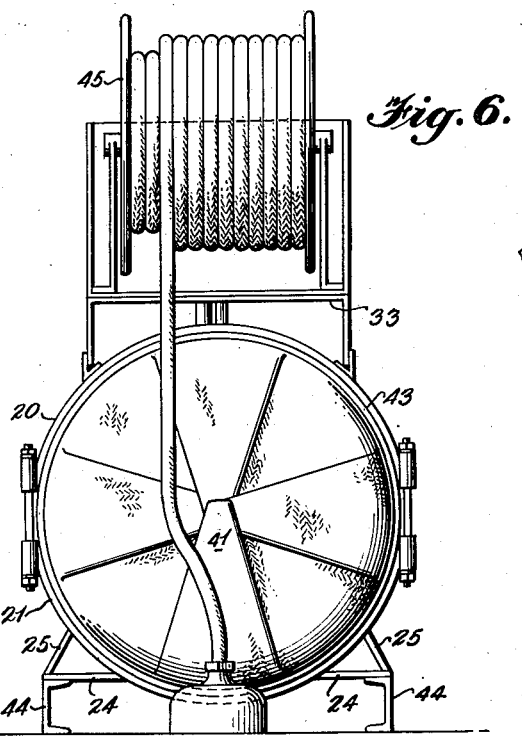
INVENTOR.
*Harry B. Quarfoot*
BY
ATTORNEY Patented June 20, 1950

2,512,552

UNITED STATES PATENT OFFICE 2,512,552

PRESSURE VESSEL ASSEMBLY

Harry B. Quarfoot, Chicago, Ill., assignor to Cardox Corporation, Chicago, Ill., a corporation of Illinois Application August 29, 1945, Serial No. 613,382

10 Claims. (Cl. 220—15)

This invention relates to tanks, and more particularly to insulated tanks for storing gases at low temperatures. A particular use of the tank with which the invention is concerned is the storage of carbon dioxide at such a low temperature and correspondingly reduced vapor pressure that it is in the liquid state.

Liquid carbon dioxide has had wide spread commercial development in the last several years as a medium for fighting fires. For this purpose it is important to have available at all times a supply of liquid carbon dioxide so that it may be instantly used. In storing the liquid carbon dioxide in tanks, it is important that it be maintained at a low temperature as this reduces the pressure of the gas within the tank. The storage tank, therefore, should be well insulated to reduce the transfer of heat from the exterior.

It is a primary object of the invention to provide an insulated tank, the elements of which are of low cost and which can be readily assembled to make the completed unit. It is particularly intended that the material of one element may be varied to suit particular situations or to employ cheaper or more expensive materials, without requiring a change in the other elements.

The storage tank for the liquid carbon dioxide may, in some instances, be stationary, but in other instances it is desired that it be mobile so that it can be moved to the place of use. This mobility is of particular importance for fire fighting equipment so that the storage tank may be quickly brought to the fire. With the mobile units different kinds of wheels may be necessary to fit different situations. For example, it sometimes may be desirable to have caster wheels as these wheels permit quick shifting of the tank, but in other instances it may be desirable to employ large wheels since they make it easier to move the apparatus. These wheels may be pneumatic tired, but since in some situations the pneumatic tires would be subjected to deteriorating liquids which may be on the floor, it may be necessary to use ordinary steel rimmed wooden wheels.

It is an object of the present invention to provide an insulated storage tank which lends itself to use either as a stationary tank or as a part of a mobile unit. In this respect the invention contemplates a basic insulated tank assembly having external straps, these straps not only serving to hold the insulating material in place, but also serving as means for the attachment of either stationary supports or wheeled supports.

A further object of the invention is to so construct the insulated tank assembly that wheels of different kinds may conveniently be attached to it. These wheels may be either caster, rubber tired or metal banded wheels.

Another object of the invention is to provide an insulated tank which may, if desired, be readily housed in a casing to improve its appearance. This casing may be applied to a stationary tank or may equally as well be applied to a mobile tank irrespective of the wheels thereon.

A still further object of the invention is the provision of an insulated storage tank assembly which includes means for supporting auxiliary equipment associated with the tank. This may include a compressor unit, a hose storage chamber or a hose reel, for example. As a feature of the invention, such accessory equipment is carried by the straps to which are attached the supports for the tank.

A further object of the invention is to provide an insulated storage tank assembly so constructed that it has the necessary mechanical rigidity although there is no metallic connection to the tank for supporting it or enclosing it with insulation. There are consequently no metal attachments to the tank from the exterior through which heat may be transferred except for the pipe connections.

Other objects will appear from the following description when considered in connection with the drawings in which:

Figure 1 is a side elevation of an insulated tank provided with means for its wheeled support, Figure 2 is an elevation of the left hand end of Figure 1, Figure 3 is a section on the line 3—3 of Figure 2, Figure 4 is a section on the line 4—4 of Figure 1, Figure 5 is a section on the line 5—5 of Figure 1, Figure 6 is an end elevation of an insulated tank provided with stationary supports and different accessory equipment, Figure 7 is a section through one end of the assembly of Figure 6.

The tank 10 may be of any desired construction. If employed for the storage of liquid carbon dioxide, it should be gas tight, and the tank here shown is of welded construction. The tank which is shown is cylindrical and has outwardly bowed ends, but the invention may be applied equally as well to a tank having other shapes.

Attached to the tank 10 are a plurality of pipes 11. These are employed to fill the tank with carbon dioxide under pressure, to withdraw the liquid and to attach accessories. Some of these pipes may merely enter into the top of the tank while others may descend to a lower portion of the tank. They are preferably grouped together as shown since this simplifies the fabrication of the insulated tank assembly.

Adjacent to each end of the tank is a row of spacer blocks 12. These are located at intervals circumferentially around the tank. The inner faces of the spacer blocks preferably conform to the exterior shape of the tank and their outer faces are preferably of arcuate shape. These blocks should be of relatively strong material having a low thermal conductivity and for this purpose wood is a suitable material.

To hold the blocks 12 on the tank during assembly, they are initially attached to a band 13 of material such as canvas. Each band 13, with its attached blocks 12, is then brought around the tank at the proper location, and the ends of the bands are secured together. This may be accomplished by nailing the ends of the band 13 to the blocks.

After the blocks 12 have been thus applied to the tank, insulating material 14 is placed around the tank to the depth of the spacer blocks. This insulating material is preferably of the character which will adhere to the tank as it is applied since this facilitates its employment. This insulating material should fill the spaces between the blocks 12 and should cover the ends of the tank.

A sheet of material 15 is then brought about the tank and upon the spacer blocks 12. This sheet 15 may be of any material which will provide a hermetic seal about the tank. Examples of such material are sheet metal, metal foil, plastic sheets, and treated cloth, as coated canvas. This material should be larger than the tank so as to extend beyond the ends of the tank.

In the embodiment of the invention appearing in Figures 1 to 5, the material 15 is sheet metal. Its meeting edges are overlapped as shown at 16 in Figure 4 and these ends are welded or brazed to make a moisture-proof seal. Flanged discs 17 preferably of this same material are then secured as by welding or brazing to the ends of cylindrically shaped sheet metal 15 so that a complete and tight casing is formed.

Where the pipes 11 pass through the sheet metal 15, a plate 18 is welded or brazed to the pipes and also to the sheet metal 15. This plate 18 with its welding or brazing should establish a tight seal about all the pipes to prevent the passage of air or moisture.

Encircling the cylindrical sheet metal 15 at the location of the rows of blocks 12 are straps, here shown as being made up of an upper piece 20 and a lower piece 21. These strap pieces are slightly less than semi-circles in extent so that they may be tightly pulled together about the tank. Draw bolts 22 pass through end lugs on the strap pieces and nuts 23 may be tightened to clamp them in place.

The spacer blocks 12 withstand the compression exerted by the strap pieces 20 and 21 so that the insulating material is relieved of this pressure. The spacer blocks 12 furthermore prevent compression of the insulating material at other points around the tank. By drawing tightly on the nuts 23, a rigid assembly results.

To support the tank assembly, brackets are secured to the lower straps 21. This may conveniently be done by forming a built-up bracket of a base plate 24 and a gusset plate 25. These plates 24 and 25 are secured together and to the straps 21 by welding at their meeting edges. Two such brackets are applied to corresponding points on each strap 21 at both ends of the tank so that there are a total of four such brackets on the underside of the assembly. The plates 24 should be so positioned that they lie in a common plane parallel to the axis of the tank.

Channel members 26 are secured to the base plates 24 so that they extend lengthwise of the tank assembly along its underside. Axles 27 are attached to channels 26 and this may best be accomplished by welding the axles 27 to blocks 28 which fit into and are welded to the channel members 26. Pneumatic tired wheels 29 are here shown rotatably mounted on the axles 27.

Instead of the wheels 29, it is possible to use solid wheels as those having a metal rim. If desired, the front axles 27 may be guidable to more easily wheel the assembly around corners. Or instead of the axles 27, caster wheels may be attached to the blocks 28 or directly to channels 26.

The invention contemplates the attachment of supporting means on the upper side of the tank to carry auxiliary equipment, such as refrigerating apparatus or a hose rack. This support is provided by securing, as by welding, to each one of the upper straps 20 a pair of angle members 31. The upright arms of angle members 31 receive between them the depending sides 32 of a table support 33. The table support 33 preferably provides a flat upper surface which is parallel to the base plates 24 on the under side of the assembly.

It will be appreciated that the attaching of the angle members 31 to both of the upper pieces 20 of the straps and the attaching of the table support 33 to said angle members performs the additional function of interconnecting and bracing the straps at the top of the tank in a somewhat similar manner to the interconnecting and bracing function performed for the straps at the bottom of the tank by the base and gusset plates 24 and 25 and the longitudinal channels 26. The table support 33 also provides a cover or protection for the top portion of the sheet metal covering 15.

To the table support 33 may be affixed a refrigerating apparatus indicated at 34. It is also possible to attach to the upper side of table support 33 a container 35 in which a hose 36 may be coiled. A fire fighting nozzle 37 is shown attached to the free end of hose 36.

Some of the modifications or variations contemplated by the invention are shown in Figures 6 and 7. In this arrangement the hermetic seal is made of non-metallic sheet material 40, as for example treated canvas. This sheet 40 is sufficiently large that it can be brought together and folded to form closed ends at 41. Suitable adhesive sealing material is then applied at these seams and around the pipes 11 so that a tight seal is established. Or, at the pipes 11, the sheet material 40 may be clamped to a plate, such as 18, which is welded to the pipes 11.

When such non-metallic sheet material is employed, a gasket or protective shield 42 is placed between the band 13 and the sheet material 40. Also, a similar shield 43 is placed between the sheet material 40 and strap pieces 20. These gaskets may be of some pliable material, as canvas.

In the arrangement of Figures 6 and 7, the tank assembly is supported upon channels 44 which are intended to establish a stationary mounting for the tank. These channels 44 are attached to the brackets made up of plates 24 and 25. The channels 44 should be high enough to elevate the tank assembly above the floor. It will be observed that the same strap pieces 20 and 21 are employed and that they are tightened by bolts 22.

Instead of the container 25 mounted on the table support 33 to receive the hose, the reel 45, shown in Figure 6, may be employed. This reel 45 may be of conventional construction and its details are therefore not shown here. The refrigerating apparatus 34 will be mounted on the table support in the arrangement of Figure 6.

These units, whether stationary or mobile, are each a completely self-contained source of refrigerated carbon dioxide. All that is necessary is that the electric conduit supplying the refrigerator apparatus 35 with electricity be connected to any conveniently located electrical outlet. The unit will then maintain its own low temperature and may be drawn upon at will to supply carbon dioxide. If the unit is a mobile one, it is merely necessary to withdraw the electric conduit from the outlet and move it to the desired location. Since the hose is constantly attached to the tank, it is available at once for fighting fires. The tank may be refilled in the usual manner when it becomes exhausted.

It is, therefore, apparent that the arrangement of the invention permits numerous variations in the employment of materials and in the general supporting structures. Different insulating materials may be employed irrespective of whether the hermetic seal is metallic or non-metallic. Likewise, if the same insulating material is employed in different assemblies, different hermetic seals may be used. These variations are possible with wheeled as well as stationary units.

What is claimed:

1. The combination with a storage tank, of a series of circumferential rows of rigid blocks spaced lengthwise of the tank with each row completely encircling the tank, a hermetically sealed sheet material covering completely enclosing the tank outwardly of and bearing against the peripheries of said rows of blocks, insulating material filling the space between the tank and the covering, a strap completely encircling and bearing tightly against the covering at the location of each row of blocks, and means for supporting the tank attached solely to said straps.

2. The combination with a storage tank, of a series of circumferential rows of rigid blocks spaced lengthwise of the tank with each row completely encircling the tank, the blocks of each row being circumferentially spaced, a hermetically sealed sheet material covering completely enclosing the tank outwardly of and bearing against the peripheries of said rows of blocks, insulating material filling the space between the tank and the covering with the exception of that occupied by said blocks, a split strap having tightening means connecting its ends completely encircling and drawn against the covering at the location of each row of blocks, and means for supporting the tank attached solely to said straps.

3. The combination with a storage tank, of a series of circumferential rows of rigid blocks spaced lengthwise of the tank with each row completely encircling the tank, a hermetically sealed sheet material covering completely enclosing the tank outwardly of and bearing against the peripheries of said rows of blocks, insulating material filling the space between the tank and covering, a strap completely encircling and bearing tightly against the covering at the location of each row of blocks, and means for supporting the tank attached solely to said straps, said means comprising two circumferentially spaced angular brackets attached to each strap with all of the bracket having base portions that occupy a common plane that parallels the axis of the tank, and a channel member on each side of the tank attached to all of the brackets on its side of of the tank.

4. The combination with a storage tank, of a series of circumferential rows of rigid blocks spaced lengthwise of the tank with each row completely encircling the tank, the blocks of each row being circumferentially spaced, a hermetically sealed sheet material covering completely encircling the tank outwardly of and bearing against the peripheries of said rows of blocks, insulating material filling the entire space between the tank and the covering with the exception of that occupied by the spaced blocks, a split strap having tightening means connecting its ends completely encircling and drawn tightly against the covering at the location of each row of blocks, and means for supporting the tank attached solely to said straps, said means comprising two circumferentially spaced angular brackets attached to each strap with all of the brackets having base portions that occupy a common plane that parallels the axis of the tank, and a channel member on each side of the tank attached to all of the brackets on its side of the tank.

5. The combination with a storage tank, of a series of circumferential rows of rigid blocks spaced lengthwise of the tank with each row completely encircling the tank, the blocks of each row being circumferentially spaced, a band tightly wrapped around the blocks of each row and anchored at its ends to hold the blocks in place, insulating material applied to all exposed surfaces of the tank to a depth approximately equal to the depth of said blocks, a hermetically sealed sheet material covering completely enclosing the tank outwardly of the blocks and insulation and bearing against the bands holding said blocks, a strap completely encircling and bearing tightly against the covering at the location of each row of blocks, and means for supporting the tank attached solely to said straps.

6. The combination with a storage tank, of a series of circumferential rows of rigid blocks spaced lengthwise of the tank with each row completely encircling the tank, the blocks of each row being circumferentially spaced, a band tightly wrapped around the blocks of each row and anchored at its ends to hold the blocks in place, insulating material applied to all exposed surfaces of the tank to a depth approximately equal to the depth of said blocks, a hermetically sealed sheet material covering completely enclosing the tank outwardly of the blocks and insulation and bearing against the bands holding said blocks, a strap completely encircling and bearing tightly against the covering at the location of each row of blocks, and means for supporting the tank attached solely to said straps, said means comprising two circumferentially spaced angular brackets attached to each strap with all of the brackets having base portions that occupy a common plane that parallels the axis of the tank, and a channel member on each side of the tank attached to all of the brackets on its side of the tank.

7. The combination with a storage tank, of a series of circumferential rows of rigid blocks spaced lengthwise of the tank with each row completely encircling the tank, a hermetically sealed sheet material covering completely enclosing the tank outwardly of and bearing against the peripheries of said rows of blocks, insulating material filling the space between the tank and the covering, a strap completely encircling and bearing tightly against the covering at the location of each row of blocks, means attached to the straps at circumferentially spaced points and overlying the entire upper portion of the tank for interconnecting and bracing the straps and for covering the top portion of the sheet metal covering, and means for supporting the tank attached solely to said straps at the lower portion of the tank.

8. The combination with a storage tank, of a series of circumferential rows of rigid blocks spaced lengthwise of the tank with each row completely encircling the tank, a hermetically sealed sheet material covering completely encircling the tank outwardly of and bearing against the peripheries of said rows of blocks, insulating material filling the space between the tank and the covering, a strap completely encircling and bearing tightly against the covering at the location of each row of blocks, means attached to the straps at circumferentially spaced points and overlying the entire upper portion of the tank for interconnecting and bracing the straps and for covering the top portion of the sheet metal covering, and means for supporting the tank attached solely to said straps at the lower portion of the tank, said means comprising two circumferentially spaced angular brackets attached to each strap with all of the brackets having base portions that occupy a common plane that parallels the axis of the tank, and a channel member on each side of the tank attached to all of the brackets on its side of the tank.

9. The combination with a storage tank, of a series of circumferential rows of rigid blocks spaced lengthwise of the tank with each row completely encircling the tank, insulating material applied to all exposed surfaces of the tank to a depth approximately equal to the depth of said blocks, a hermetically sealed covering completely enclosing the tank outwardly of the blocks and insulation and bearing against said blocks, said covering comprising a cylinder of sheet material surrounding the periphery of the insulated tank and discs of sheet material closing the ends of the cylinder, a strap completely encircling and bearing tightly against the covering at the location of each row of blocks, and means for supporting the tank attached solely to said straps.

10. The combination with a storage tank, of a series of circumferential rows of rigid blocks spaced lengthwise of the tank with each row completely encircling the tank, insulating material applied to all exposed surfaces of the tank to a depth approximately equal to the depth of said blocks, a hermetically sealed covering completely enclosing the tank outwardly of the blocks and insulation and bearing against the blocks, said covering comprising a sheet of material wrapped around the periphery of the insulated tank and being of sufficient length relative to the length of the tank to be folded over each end of the tank to completely cover the latter, a strap completely encircling and bearing against the covering at the location of each row of blocks, and means for supporting the tank attached solely to said straps.

HARRY B. QUARFOOT.

REFERENCES CITED

The following references are of record in the file of this patent:

UNITED STATES PATENTS

| Number | Name | Date |
|---|---|---|
| 1,228,378 | Brown | May 29, 1917 |
| 1,316,949 | Hall | Sept. 23, 1919 |
| 1,452,487 | Auchincloss | Apr. 24, 1923 |
| 1,730,153 | Lindsay | Oct. 1, 1929 |
| 1,879,392 | Miller | Sept. 27, 1932 |
| 2,025,739 | Templin et al. | Dec. 31, 1935 |

FOREIGN PATENTS

| Number | Country | Date |
|---|---|---|
| 367,589 | Great Britain | Feb. 25, 1932 |